Sept. 20, 1960     R. L. ANDERSON     2,953,266
COMBINATION BOAT AND UTILITY TRAILER
Filed Nov. 18, 1957     2 Sheets-Sheet 1
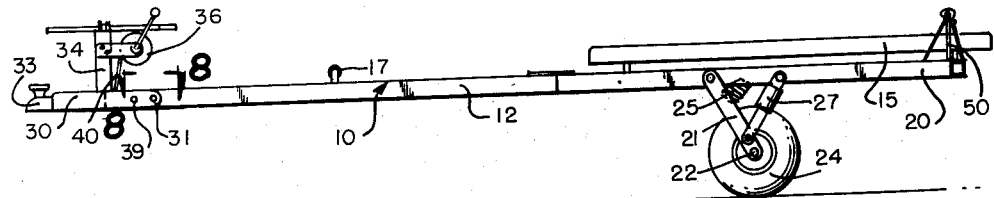
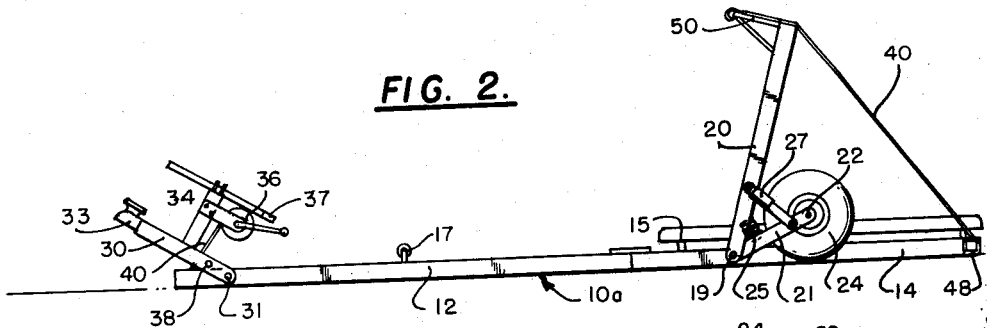
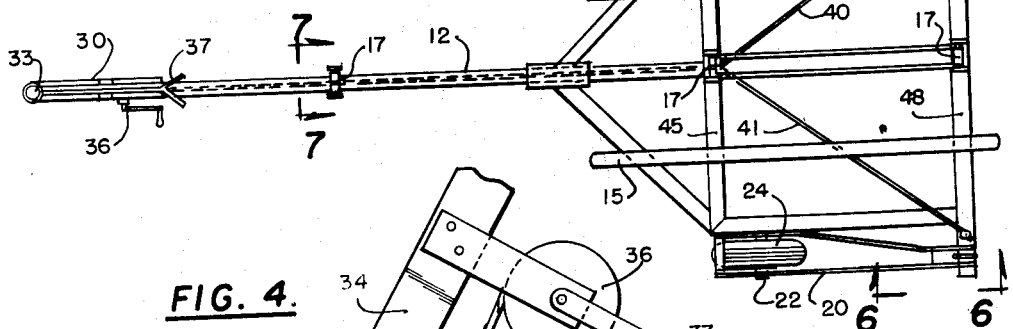
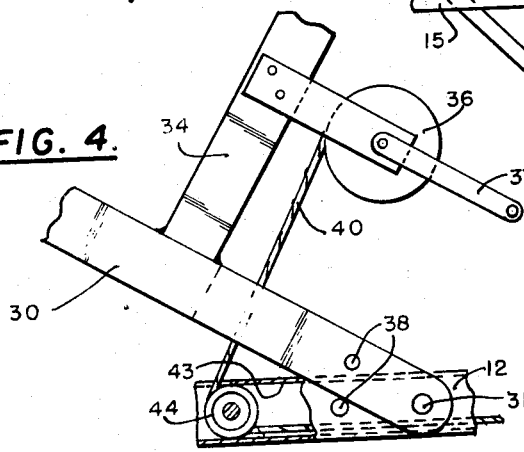
INVENTOR.
Rral L. Anderson

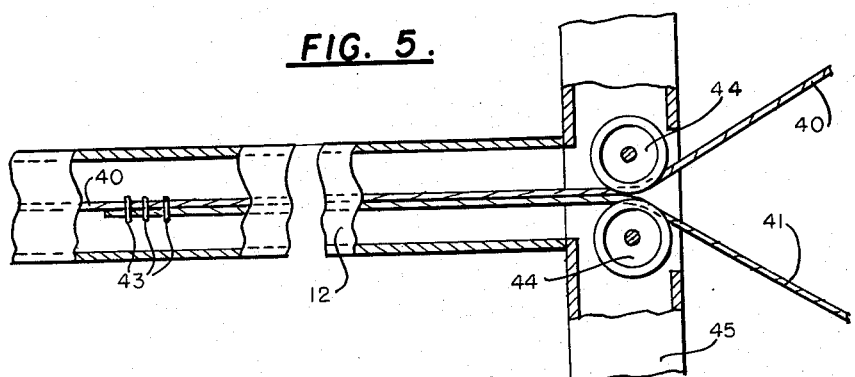
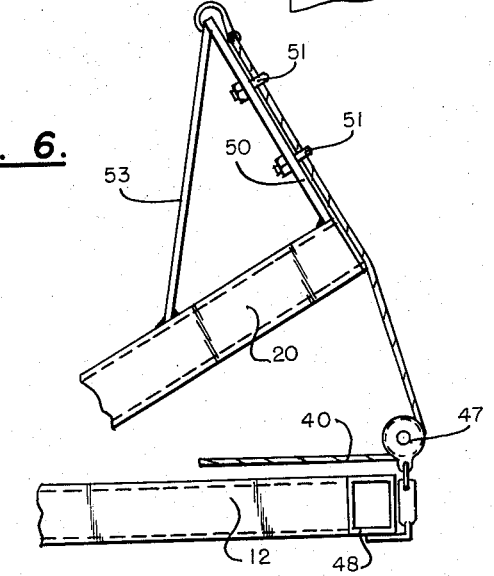
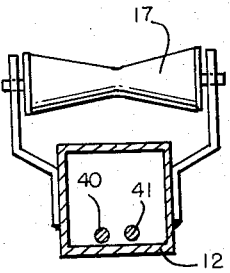
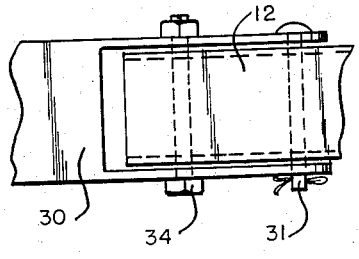
INVENTOR
Rral L. Anderson

United States Patent Office 2,953,266
Patented Sept. 20, 1960

2,953,266

COMBINATION BOAT AND UTILITY TRAILER

Rral L. Anderson, Rte. 6, Box 512, Tyler, Tex.

Filed Nov. 18, 1957, Ser. No. 697,145

8 Claims. (Cl. 214—506)

This invention relates to trailers and more particularly to a combination boat and utility trailer.

It is an object of the present invention to provide a manually operable boat and utility trailer as can be quickly and conveniently used to load and unload various types of boats and the like with a minimum amount of effort.

It is another object of the present invention to provide a boat trailer including a boat supporting frame and novel and improved frame lifting means that is easily and quickly manipulated to move the frame between a normal raised position relative to the ground and an adjusted lowered position at the level of the ground.

Still a further object of the present invention is to provide a combination boat and utility trailer of the above type which includes mechanical advantage means for effecting the aforementioned raising and lowering of the frame so that many types of light weight boats can be readily launched and loaded by a single individual.

Other objects of the invention are to provide a combination boat and utility trailer bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

Figure 1 is a side elevational view of a trailer made in accordance with the present invention in a normal operative position;

Figure 2 is a view similar to Figure 1, showing the trailer in a loading and unloading position;

Figure 3 is a top plan view of the device shown in Figure 1;

Figure 4 is an enlarged fragmentary side elevational view, with parts broken away, showing the forward end of the boat trailer;

Figure 5 is an enlarged fragmentary top plan view, with parts broken away, showing the main carriage portion of the trailer;

Figure 6 is an enlarged side elevational view, with parts broken away, taken along line 6—6 of Figure 3 showing the rear portion of the trailer in an adjusted position;

Figure 7 is an enlarged transverse cross sectional view taken along line 7—7 of Figure 3; and Figure 8 is an enlarged transverse cross sectional view taken along line 8—8 of Figure 1.

Referring now more in detail to the drawing, a combination boat and utility trailer 10 made in accordance with the present invention is shown to include a main longitudinal stringer 12 having a main carriage portion 14 at the rear end thereof which has a pair of longitudinally extending and transversely spaced apart slides 15 for guiding the movement of the boat thereon. A plurality of longitudinally spaced apart rollers 17 carried by the stringer 12 provides anti-friction means for facilitating the movement of the boat between adjusted longitudinal position.

As is more clearly shown in Figures 2 and 3 of the drawing, a rear wheel support arm 20 is hingedly connected at one end to each side of the main carriage portion 14 by means of a pivot pin assembly 19. An angularly inclined axle support brace 21 having a wheel supporting axle 22 at one end for rotatably supporting a rear wheel 24 is pivotally connected at its opposite end to the hinge pin 19 of the support arm 20. A compression spring 25 is disposed between the intermediate portion of the axle support brace 21 and the rear wheel support arm 20 so as to provide a yielding support for the trailer. A shock absorber 27 that acts between intermediate portions of the wheel support arm 20 and axle support brace 21 further resists shocks and controls the spring action of the unit.

At the front end of the longitudinal stringer 12, a front hitch link 30 is pivotally connected thereto by means of a hinge pin 31. The free end of this link 30 is provided with a trailer hitch 33 for engagement with a matching trailer hitch unit on a truck or automobile. A perpendicularly upwardly extending mounting bracket 34 secured to the mid portion of the front link 30 supports a winch 36 for controlling the length of a cable 40, for purposes hereinafter described. This mounting bracket 34 is also provided with a keel stop 37 for limiting the forward movement of the boat supported thereon. A lock bolt 39 is releasably received within aligned transverse bores 38 in the front link 30 and the front end of the stringer 12 to lock the parts in the operative position during transport of the trailer.

A guide pulley 44 is rotatably carried at the frontmost end of the stringer 12 for guiding the cable 40 downwardly from the winch 36 into the central longitudinal bore 43 of the stringer in which it extends rearwardly toward the main carriage portion 14. An auxiliary section of cable 41 is secured to the main cable 40, such as by pins 43 so as to provide a pair of identical cable lengths that continue rearwardly around additional guide pulleys 44, from which point they diverge rearwardly toward the opposite rearmost corners of the main carriage portion 14 where they are further guided around additional guide pulleys 47 carried by the rear transverse beam 48, from which they are guided into securing engagement with the rearmost ends of each one of the wheel support arms 20. Each such arm 20 is provided with an upwardly extending leg 50 having a plurality of spaced U-bolts 51 for securing the end of the respective cable 40, 41 thereto. Additional brace members 53 maintain the legs 50 in the proper relationship and further rigidifies the unit.

As is shown in Figure 4, it will be noted that the forward guide pulley 44 is disposed forwardly of the pivot connection pin 31 of the hitch link 30 with the front of the stringer 12. Thus, in response to an unwinding movement of the winch 36, the additional cable length permits both the rear wheel support arms 20 and the front hitch link 30 to rotate about the respective pivot connections under the weight of the longitudinal stringer 12 and main carriage 14, into the loading and unloading position 10a shown in Figure 2. In this position, the boat can be loaded or unloaded from the trailer in a simple and efficient manner, either on land, or within the water. The trailer is then returned to the normal position 10 shown in Figure 1 by winding in the cable 40 on the winch 36, during which movement the length of the cable is shortened, thus forcing the respective front hitch link 30 and rear wheel support arms 20 back to the horizontal position because of the particular placement of the guide pulleys and the mechanical advantage obtained by the placement of the respective pivot connections of the arms to the stringer 12 and main carriage portion 14. It will thus be recognized that this unit can be effectively operated with a minimum amount of effort and in substantially any location.

While various changes may be made in the detail construction, it shall be understood that such changes shall be within the spirit and scope of the present invention as defined by the appended claims.

What I claim as new and desire to protect by Letters Patent of the United States is:

1. A combination boat and utility trailer comprising, in combination, a longitudinal main stringer, a main carriage at the rear end of said stringer, a hitch link pivotally connected to the front end of said stringer, a pair of wheel support arms one pivotally connected at one end to each side of said main carriage, cable means extending between said hitch link and each said wheel support arm, and means for winding said cable to control the pivotal movement of said hitch link and said wheel support arm between a normal horizontal position and an inclined trailer loading and discharge position.

2. The combination according to claim 1, wherein each wheel support arm includes an axle support brace having a wheel rotatably supported at one end and pivotally connected at the opposite end to said one end of said respective wheel support arm defining an acute angle therewith.

3. The combination according to claim 2 further comprising a compression spring acting between an intermediate portion of each said wheel support arm and said associated axle support brace.

4. The combination according to claim 3, wherein each said stringer includes a side pulley at said front end, and said hitch link is pivotally connected to said stringer rearwardly of said front guide pulley.

5. The combination according to claim 4, wherein said cable winding means is supported upon said hitch link with said cable extending around said front pulley, and a lock bolt is releasably secured to said stringer and said hitch link intermediate said front pulley and said pivotal connection of said hitch link to said stringer.

6. The combination according to claim 5, wherein said cable extends around rear guide pulleys at the rear end of said main carriage and is connected to the opposite rear end of both of said wheel support arms.

7. The combination according to claim 6, further comprising shock absorbers acting between said main carriage and each said axle support brace.

8. A trailer comprising a longitudinal frame having a central forwardly projecting tongue adapted for coupling to a vehicle at the rear, transversely spaced wheels disposed adjacent the sides of the frame, means mounting the wheels on the frame for vertical adjustment between relative lowered and raised position, a winch mounted on the tongue, the tongue being articulated for downward buckling from and return to a normal draft position, and a cable system connected between the winch, the articulated tongue, and said wheel mounting means operative to cause the tongue to buckle downward or return to said draft position and to cause simultaneous adjustment of the wheels to said raised or lowered position, respectively.

References Cited in the file of this patent
UNITED STATES PATENTS

| | | |
|---|---|---|
| 2,485,793 | Vassar | Oct. 25, 1949 |
| 2,807,381 | Tegeler | Sept. 24, 1957 |